United States Patent [19]

Inomata et al.

[11] Patent Number: 5,473,317
[45] Date of Patent: Dec. 5, 1995

[54] AUDIO-VISUAL SYSTEM HAVING INTEGRATED COMPONENTS FOR SIMPLER OPERATION

[75] Inventors: Kaname Inomata, Kanagawa; Yutaka Noguchi, Saitama, both of Japan

[73] Assignee: Kabushiki Kaisha Toshiba, Kanagawa, Japan

[21] Appl. No.: 396,055

[22] Filed: Feb. 28, 1995

Related U.S. Application Data

[63] Continuation of Ser. No. 27,582, Mar. 5, 1993, abandoned, which is a continuation of Ser. No. 731,320, Jul. 17, 1991, abandoned.

[30] Foreign Application Priority Data

Jul. 17, 1990 [JP] Japan .................................. 2-188824
Feb. 28, 1991 [JP] Japan .................................. 3-034776

[51] Int. Cl.$^6$ ......................................... H04Q 1/00
[52] U.S. Cl. ............................... 340/825.25; 340/825.06; 340/825.72; 359/148
[58] Field of Search ......................... 340/825.25, 825.21, 340/825.22, 825.69, 825.72, 825.06, 825.14; 348/734, 705, 525; 359/142, 143, 146, 148; H04N 5/44

[56] References Cited

U.S. PATENT DOCUMENTS

| | | | |
|---|---|---|---|
| 4,496,947 | 1/1985 | Nakashima et al. | 340/825.24 |
| 4,706,121 | 11/1987 | Young | 340/825.22 |
| 4,771,283 | 9/1988 | Imoto | 340/825.72 |
| 4,841,368 | 6/1989 | Rumbolt et al. | 358/194.1 |
| 4,855,730 | 8/1989 | Venners et al. | 340/825.24 |
| 4,989,081 | 1/1991 | Miyagawa et al. | 358/194.1 |
| 5,081,534 | 1/1992 | Geiger et al. | 358/194.1 |

FOREIGN PATENT DOCUMENTS

| | | |
|---|---|---|
| 0325331 | 7/1989 | European Pat. Off. . |
| 0326205 | 8/1989 | European Pat. Off. . |
| 0331257 | 9/1989 | European Pat. Off. . |
| 0371749 | 6/1990 | European Pat. Off. . |

OTHER PUBLICATIONS

Yutaka Noguchi, Toshiba Review, vol. 44, No. 11 (1989): cover page, table of contents, and pp. 925–928.

*Primary Examiner*—Donald J. Yusko
*Assistant Examiner*—Edwin C. Holloway, III
*Attorney, Agent, or Firm*—Finnegan, Henderson, Farabow, Garrett & Dunner

[57] ABSTRACT

An audio-visual system including a plurality of audio-visual components, and a control panel or remote control unit for applying an operating signal to each of the components. Each component performs a specified operation corresponding to the operating signal. A status detector for detecting operation status of each of the plurality of audio-visual components. A switch for switching the audio-visual components to the status required to perform the specified operations, and remote control code transmitter generates a signal to allow operation of each of the audio-visual components by converting the operating signal into a remote control code signal and transmits the remote control code signal to the audio-visual component.

5 Claims, 10 Drawing Sheets

FIG. 6
(MANUFACTURERS OF AV COMPONENTS)

| AV COMPONENT / REGISTERING ORDER | 1 | 2 | 3 | 4 | 5 | 6 | 7 | 8 |
|---|---|---|---|---|---|---|---|---|
| TV RECEIVER | TOSHIBA | SHARP | SONY | HITACHI | PANA-SONIC | MITSU-BISHI | — | — |
| BS TUNER | TOSHIBA | SONY | NEC | PANA-SONIC | — | — | — | — |
| LASER DISC PLAYER | TOSHIBA | SONY | PIONEER | PANA-SONIC | — | — | — | — |
| VCR | TOSHIBA | SHARP | SONY | NEC | HITACHI | VICTOR | PANA-SONIC | MITSU-BISHI |

5,473,317

AUDIO-VISUAL SYSTEM HAVING INTEGRATED COMPONENTS FOR SIMPLER OPERATION

This application is a continuation of application Ser. No. 08/027,582 filed Mar. 5, 1993 now abandoned which is a continuation of application Ser. No. 07/731,320 filed Jul. 17, 1991, now abandoned.

FIELD OF THE INVENTION

The present invention relates to an audio-visual system.

BACKGROUND OF THE INVENTION

In an audio-visual (AV) system a plurality of audio-visual components are systematically arranged with each other by using an AV center (or AV amplifier).

When the AV center is used, a plurality of switching operations for input and output signals are centralized. However, a user must operate a plurality of switches when using the AV center.

Shown in FIG. 1 is a flowchart showing the procedure for starting a video reproducing operation of a VCR in such an AV system as described above.

First, a user turns ON both the AV center and a television receiver (Steps 601,602). Then, he sets the input mode switch of the television receiver to "VCR" position (Step 603) and the function switch of the AV center to "VCR1" position (Step 604), turns ON the VCR (Step 605), and presses the VCR PLAY button (Step 606). Then, the video reproducing operation of the VCR starts.

Thus, on the conventional AV system, it is required to turn ON numerous switches or press the operation button when starting the video reproducing operation or other required operations.

SUMMARY OF THE INVENTION

It is, therefore, an object of the present invention to provide an AV system which is capable of having AV components perform their required operations by use of simple operations.

In order to achieve the above object, an audio-visual system according to one aspect of the present invention is provided in which the system includes a plurality of audio-visual components, a detector for detecting status of the plurality of audio-visual components by inputting to the components an operating signal which causes the components to perform specified operations, a switch for switching the audio-visual components to the status required to perform the specified operations, and an apparatus for transmitting remote control code which generates a signal to operate each of the audio-visual components by converting the operating signal into a remote control code signal and transmitting the remote control code signal to the audio-visual component.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is a table showing an example of registered manufacturers of AV components;

DESCRIPTION OF THE PREFERRED EMBODIMENTS

Figure 1:
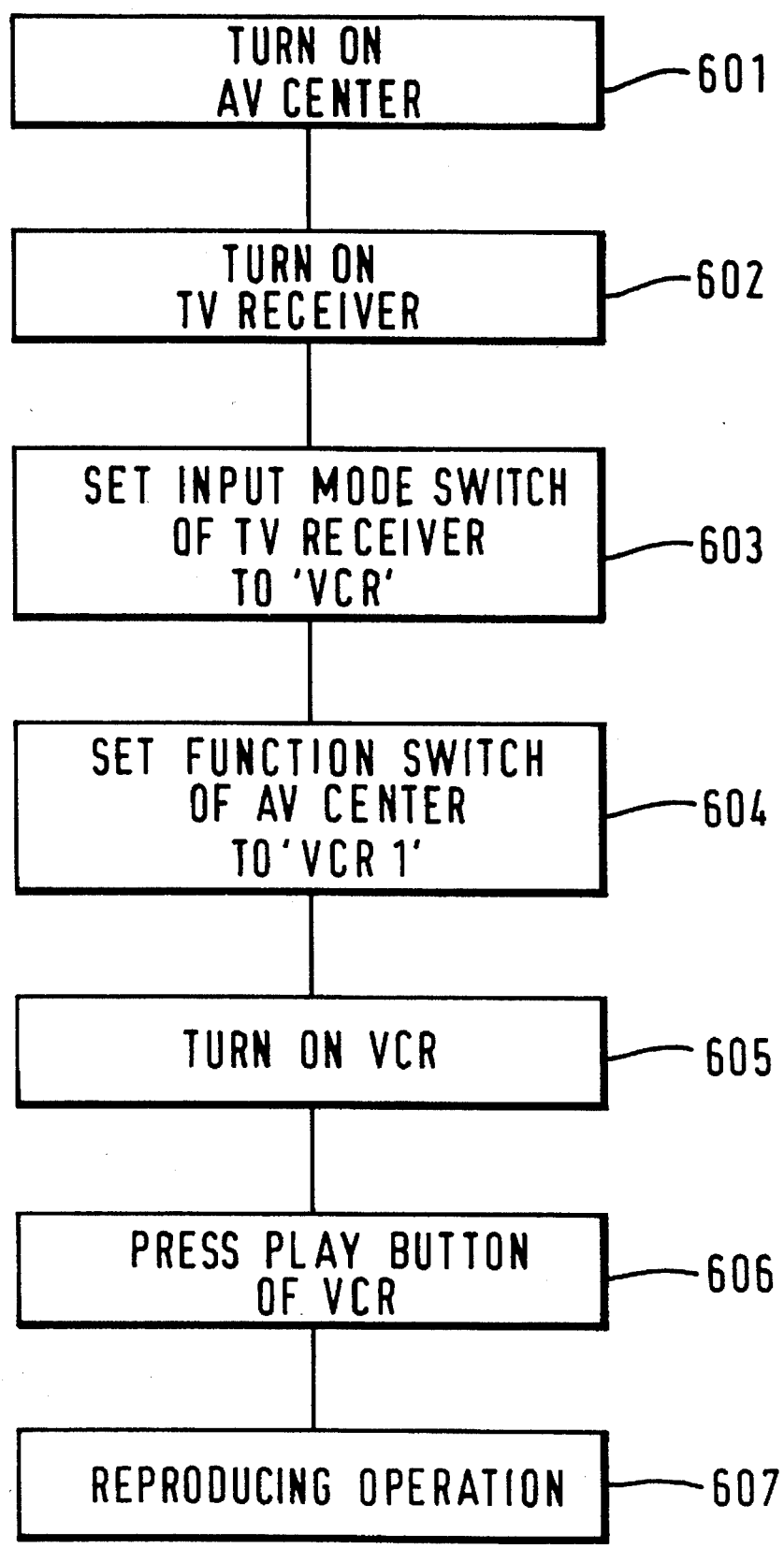
FIG. 1 is a flowchart showing a procedure for starting a video reproducing operation in a conventional AV system.

The present invention will be described in detail with reference to FIGS. 2 through 9. Throughout FIGS. 2 through 9, same or equivalent reference numerals or letters will be used to designate like or equivalent elements for simplicity of explanation.

Figure 2:
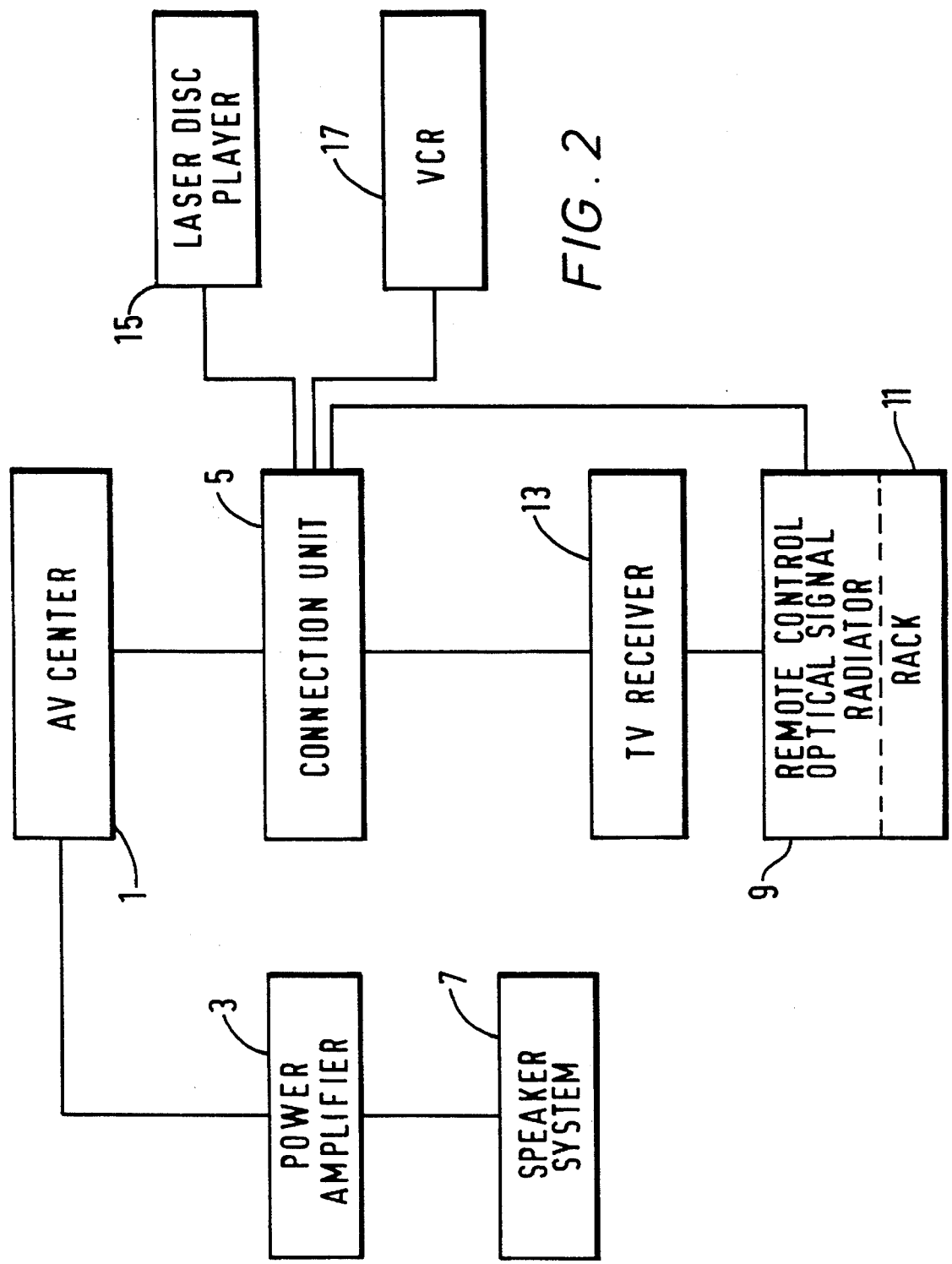
FIG. 2 is a block diagram showing the construction of the AV system according to the embodiment of the present invention.

FIG. 2 is a block diagram showing a construction of an AV system according to an embodiment of the present invention. As shown in FIG. 2, the AV system comprises an AV center 1, a power amplifier 3, a connection unit 5, a speaker system 7, a rack 11 with a remote control optical signal radiator 9, a television receiver 13, a laser disc player 15, and a video cassette recoder (VCR) 17.

The connection unit 5 is provided for operatively coupling the AV center 1, the remote control optical signal radiator 9, the television receiver 13, the laser disc player 15 and the VCR 17 with each other.

The speaker system 7 includes a pair of front left and front right AV speakers and a pair of rear left and rear right speakers.

Figure 3:
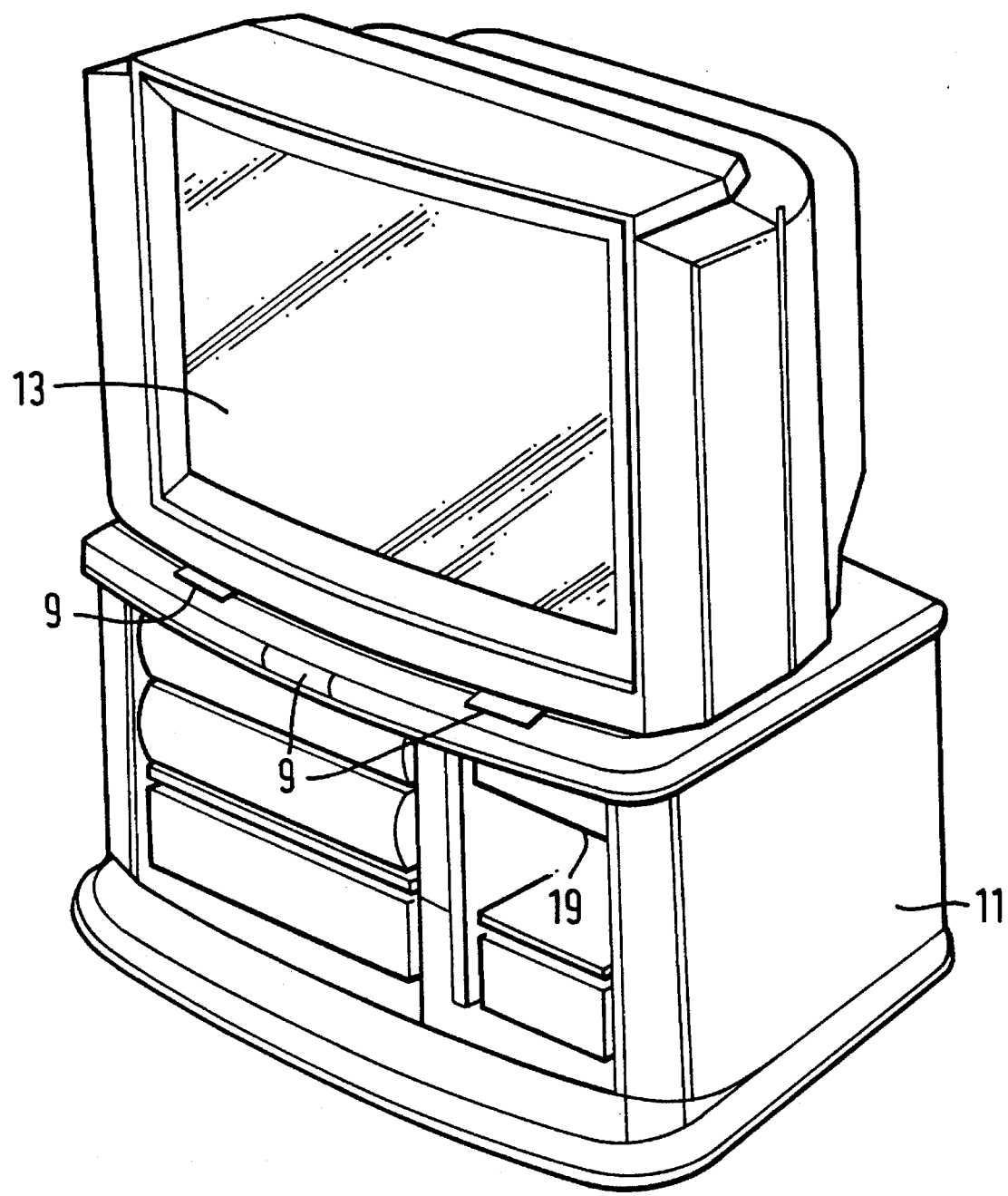
FIG. 3 is an oblique view of the rack 11 and the television receiver 13 of FIG. 2.

Shown in FIG. 3 is an oblique view of examples of the rack 11 and the television receiver 13.

As shown in FIG. 3, the television receiver 13 is settled on the rack 11. On the front top end of the rack 11, one of the optical signal radiators 9 is provided. Numeral 19 in FIG. 3 shows a space in the rack 11 which is capable of accommodating a TV-game machine.

Figure 4:
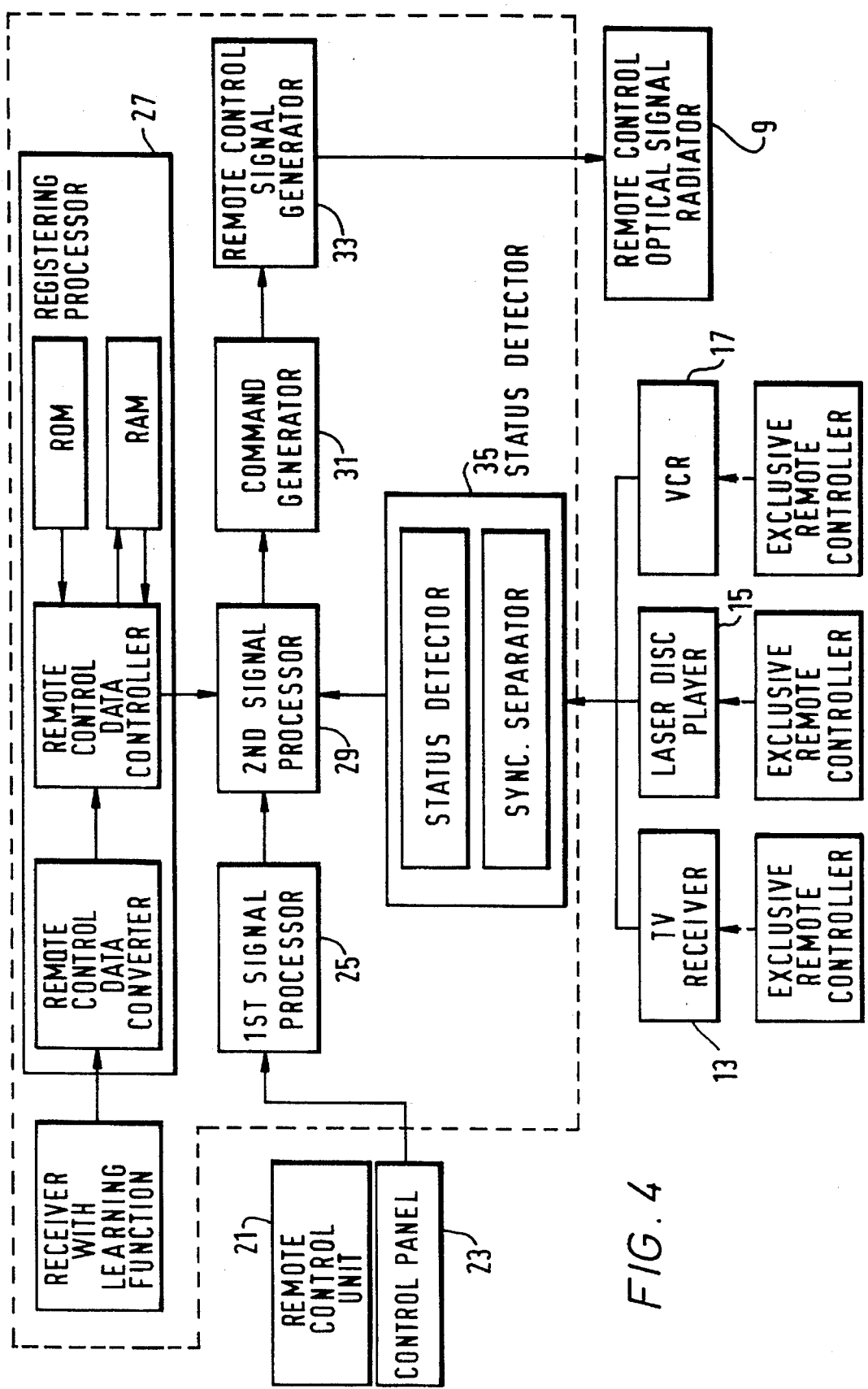
FIG. 4 is a functional block diagram of the AV system according to the present invention.

FIG. 4 is a block diagram which functionally illustrates the AV system.

Figure 10:
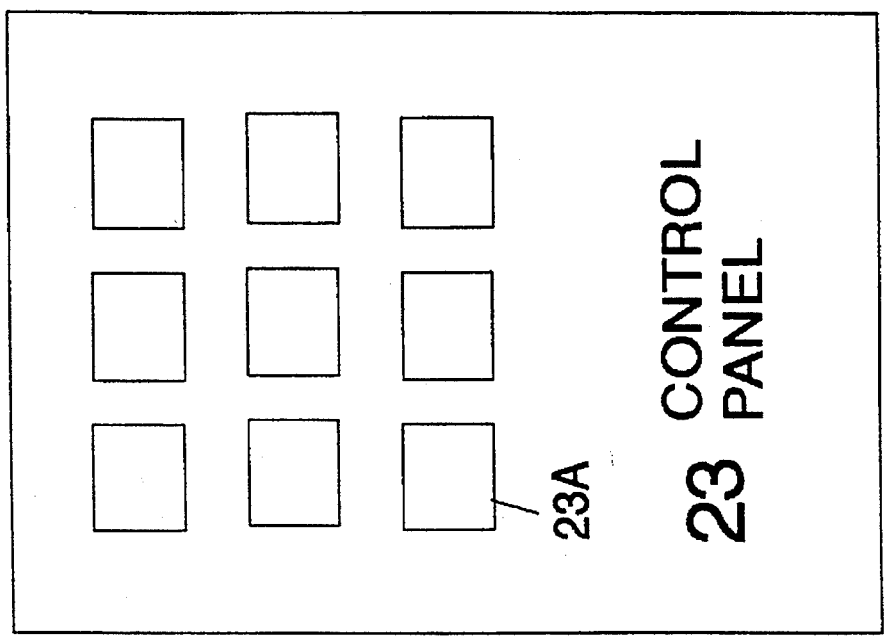
FIG. 10 is a more detailed diagram of the control panel including a plurality of keys.

A remote control unit 21 transmits required operating signals. A control panel 23 of the AV center also transmits required operating signals. The control panel 23 is shown in more detail in FIG. 10 which also shows a plurality of keys 23A on the control panel 23.

The first signal processor 25 processes signals transmitted from the remote control unit 21 or the control panel 23 of the AV center and transfers key data to a second signal processor 29 which is constructed with a CPU incorporated in the connection unit 5. The operation of the first signal processor 25 is implemented by another CPU incorporated in the AV center 1.

Operations of the registering processor 27, the second signal processor 29, the command generator 31, the remote control signal generator 33, and the status detector 35 are implemented by the CPU incorporated in the connection unit 5.

The registering processor 27 comprises a ROM which stores different remote control codes employed by every manufacturer of the AV components, a remote control data converter for measuring an external remote control signal to convert the signal into a digital data, and a remote control data controller for controlling write/read operations of the data.

The second signal processor 29 determines a control sequence of the AV components according to the key data applied from the first signal processor 25, and then reads out a required remote control data from the registering processor 27 to transfer the remote control data to the remote control signal generator 33 according to status signals of the AV components detected by a status detector 35.

The remote control signal generator 33 generates a remote control code signal corresponding to the output signal from the second signal processor 29 and transmits it to the remote control optical signal radiator 9.

The remote control optical signal radiator 9 transmits a remote control signal to each AV component for performing the required operation.

The status detector 35 detects the status of each AV component. The status detector 35 has a synchronous separator for the video signals. The status detector 35 then detects, for instance, whether the power source is ON or the input mode of the television receiver 13 is set at "VCR" and transmits the detected status to the second signal processor 29 in accordance with a presence of horizontal or vertical synchronous signal obtained in the synchronous separator.

Figure 5:
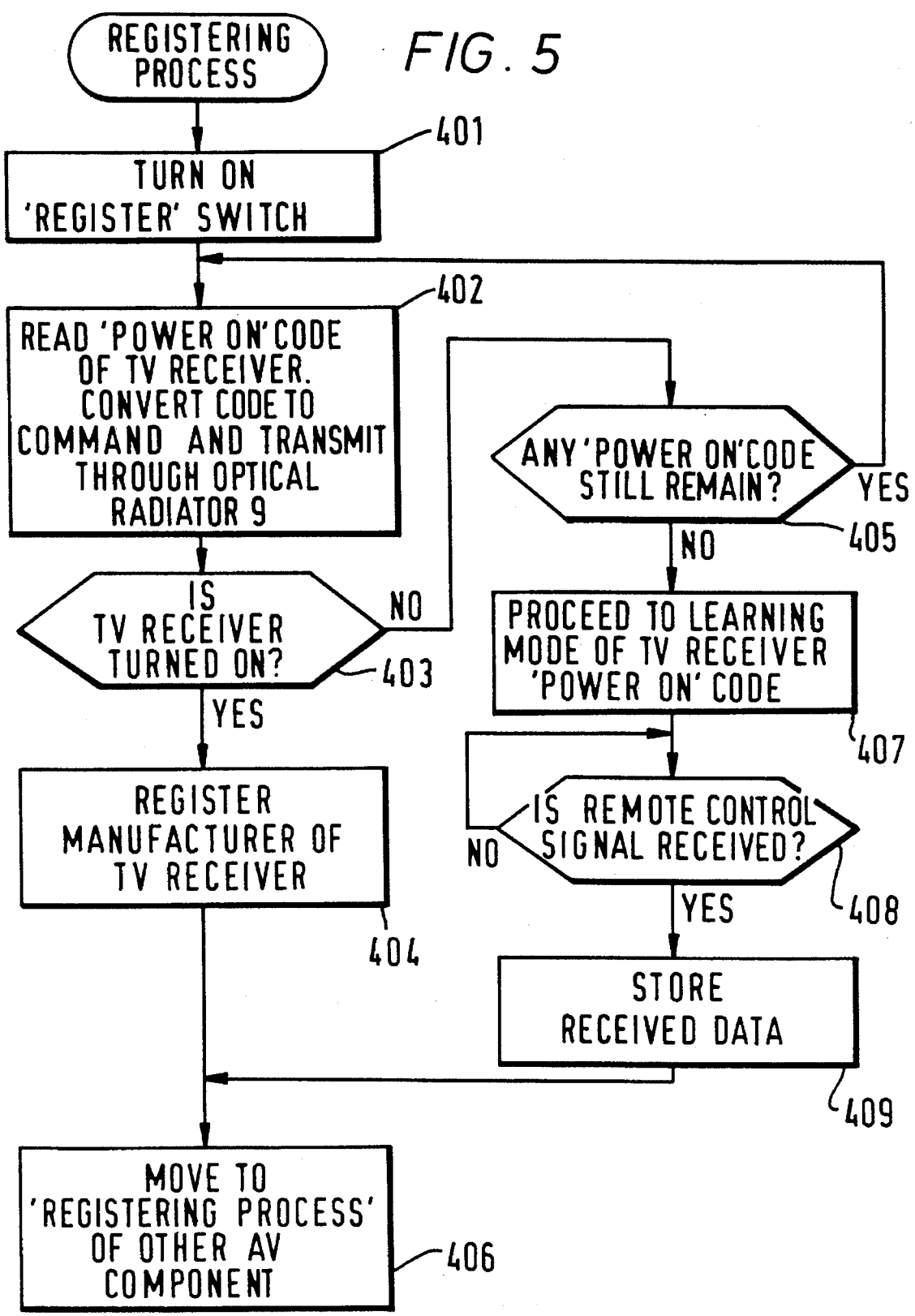
FIG. 5 is a flowchart which shows a process of a registering operation of a manufacturer of a television receiver.

Next, the operations of manufacturers of components of this AV system will be explained. Shown in FIG. 5 is a flowchart showing the operations of the registering processor 27 to register a manufacturer of television receivers.

First, a "REGISTER" switch of the AV center 1 is turned ON (Step 401). An automatic detection mode for detecting manufacturers is thus activated by the turn ON operation of the "REGISTER" switch, and a detecting operation for searching a television receiver, a satellite tuner (BS tuner), a laser disc player, and a VCR is initiated. In this example, it is assumed that all the components are initially turned OFF.

In the operation, "power ON" codes of television receivers of manufacturers which were previously registered as shown in FIG. 6 are read out in a predetermined order. Such a "power ON" code is converted into a power ON command by the remote control signal generator 33 and transmitted through the remote control optical signal radiator 9 (Step 402). Then, the status detector 35 determines whether the television receiver is turned ON in response to the power ON command transmitted in the Step 402 (Step 403). When the turn ON state of the television receiver is detected, the operation proceeds to the Step 404. If the television receiver is not turned ON, it is determined whether any "power ON" code of the television receiver of the registered manufacturers still remains (Step 405). If such a code is found, the operation returns to the Step 402 for reading out and transmitting the code.

When the codes of all the registered manufactures have been transmitted but still the television receiver is not turned ON, a notice indicating that a relevant code is not found is displayed on a display of the control panel of the AV center. Then, the operation proceeds to a learning mode of "TV power ON code" (Step 407).

Here, the user presses a TV power ON key on a remote control unit associated with the television receiver. Then, an infrared remote control data transmitted from the remote control unit is processed in the registering processor 27 (Step 408) and registered into the RAM as a new power ON code of the television receiver (Step 409).

Now, the registering operation of the codes of the manufacturer of the television receiver is completed and the operation proceeds to another registering operation for BS tuners (Step 406).

Figure 7:
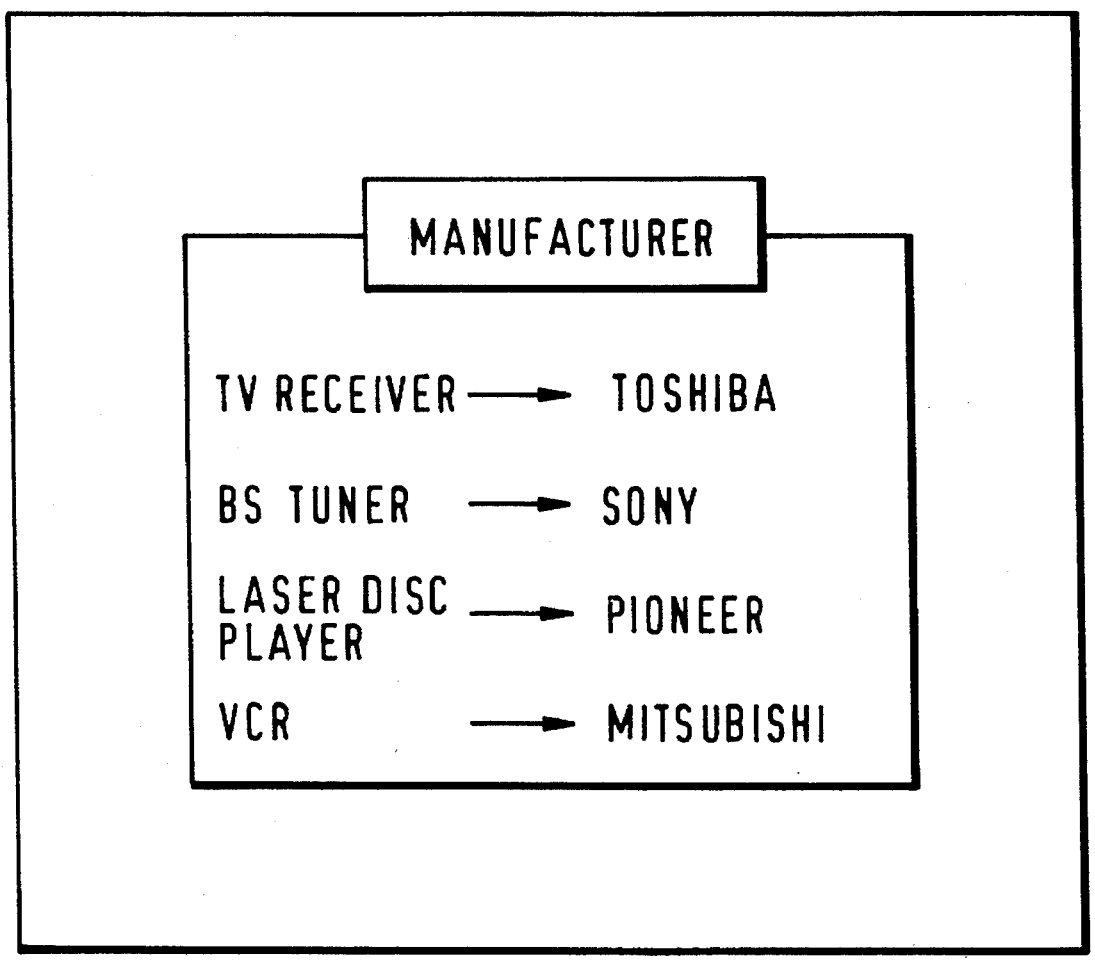
FIG. 7 is a diagram showing an example of on-screen display of the television receiver 13 when registering data.

When the television receiver has been turned ON, the manufacturer associated with the remote control unit used in the above-mentioned learning mode is registered as the manufacturer of the television receiver (Step 404), thus the operation proceeds to the registering operation for the BS tuner. Hereinafter, these registering operations are executed for BS tuners, laser disc players and VCRs in the order as shown in the flowchart. When these registering operations are completed, manufacturers of all components incorporated together are displayed on the screen of the television receiver, as shown in FIG. 7.

Hereinafter, system control for every AV components will be explained by using the remote control codes of the manufacturers of the registered AV components.

Figure 8:
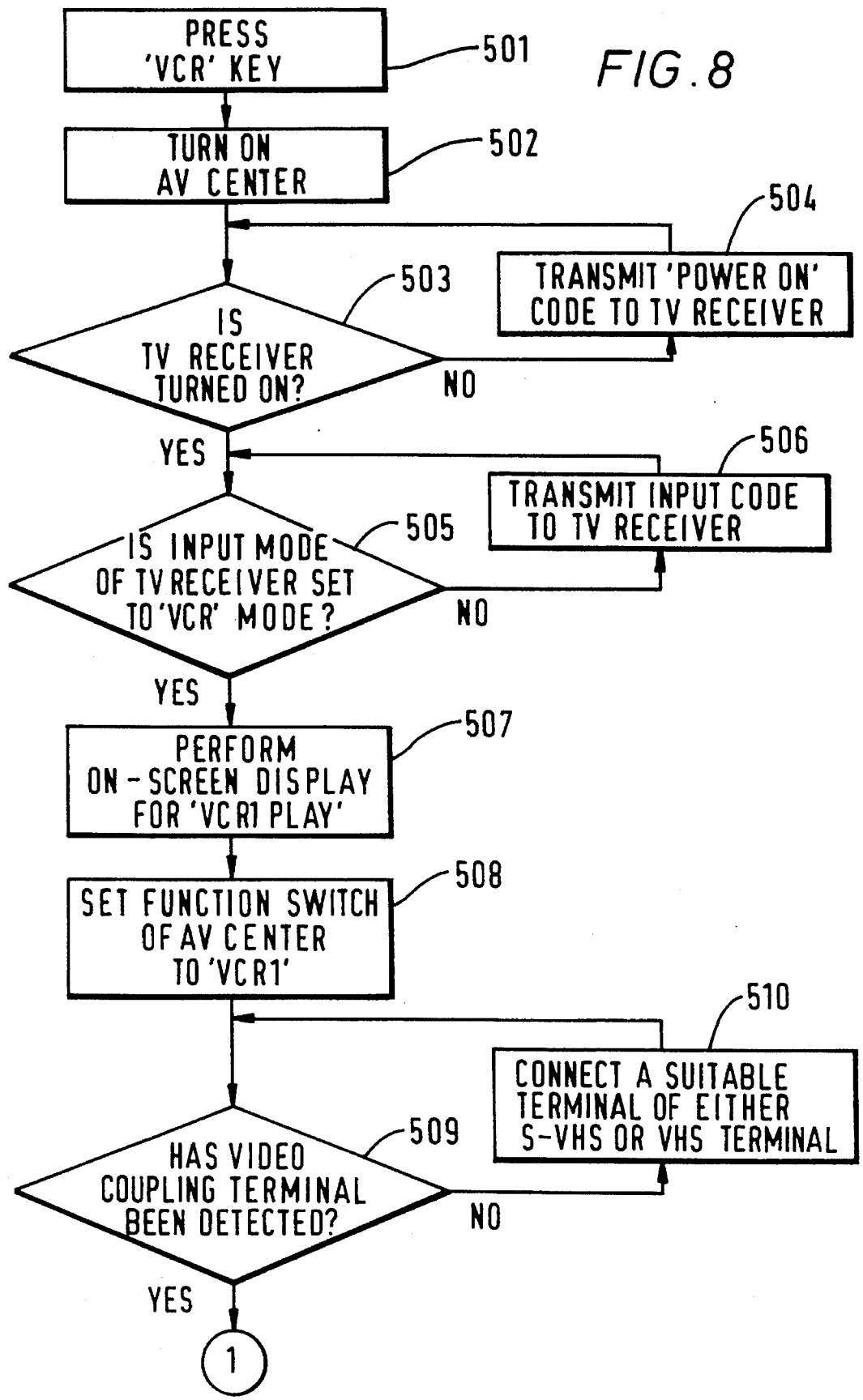
FIGS. 8 and 9 are flowcharts which together show a process of a video reproducing operation.
Figure 9:
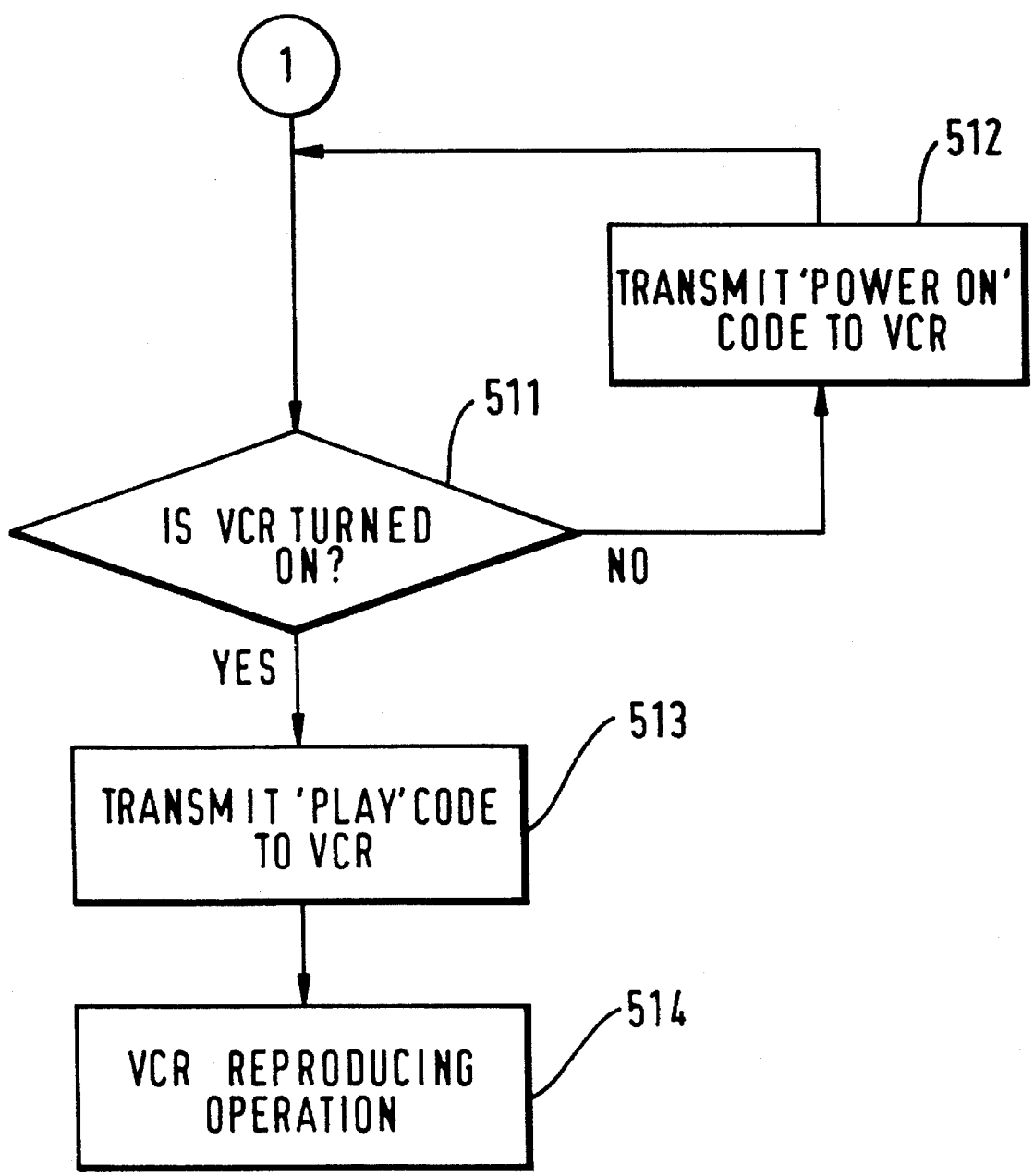

FIGS. 8 and 9 are flowcharts illustrating the operations to start the video reproducing operation in this embodiment.

A user presses the VCR key on the control panel 23 or the remote control unit 21 of the AV center (Step 501). The operation of the VCR key indicates the video reproducing operation.

This VCR key signal is transmitted to the AV center 1 via the first signal processor 25 and the AV center 1 is turned ON (Step 502).

Then, the second signal processor 29 checks whether the television receiver 13 is turned ON via the status detector 35 (Step 503). If the television receiver 13 is not turned ON, the second signal processor 29 directs the command generator 31 to create a command to turn ON the television receiver 13. The command generator 31 creates a command to turn ON the television receiver 13 and transmits this command to the remote control signal generator 33, which in turn converts it to a code signal corresponding to the manufacturer of the television receiver 13 and transmits it to the remote control optical signal radiator 9. A signal to turn ON the television receiver 13 is transmitted from the remote control optical signal radiator 9 (Step 504).

Next, the second signal processor 29 checks whether the input mode of the television receiver 13 has been set at "VCR" via the status detector 35 (Step 505) and if the input mode is not "VCR", the second signal processor 29 directs the command generator 31 to generate a command to set the input mode of the television receiver 13 to "VCR". This command signal is converted into the specified manufacturer code by the remote control signal generator 33 and is transmitted from the remote control optical signal radiator 9 to switch the input code of the television receiver 13 to "VCR" (Step 506).

Then, the second signal processor 29 performs the on-screen display (Step 507). This on-screen display is to display such a specified operation as "VCR1 PLAY" on the screen of the television receiver 13.

Then, the second signal processor 29, after setting the function switch of the AV center 1 to "VCR1" (Step 508), checks whether the video coupling terminal has been detected via the status detector 35 (Step 509). If not, second signal processor 29 checks whether either the S-VHS terminal connection or the VHS terminal connection is selected via the command generator 31, the remote control signal generator 33, and the remote control optical signal radiator 9, and the VCR is connected (Step 510).

Next, the second signal processor 29 checks whether the VCR 17 is turned ON (Step 511) and if not, transmits a signal to turn ON the VCR 17 via the command generator 31, the remote control generator 33, and the remote control optical signal radiator 9 (Step 512).

Then, the "PLAY" signal is transmitted from the remote control optical signal radiator 9 to the VCR 17 (Step 513).

Thus, in this embodiment of the present invention, the video reproducing operation is performed only by the VCR key signal from the remote control unit 21 or the control panel 23 of the AV center.

Further, although starting operations of the video reproducing operation have been explained in this embodiment, the present invention is also applicable to the play starting operations of the laser disc player 15 or the recording process starting operations of the VCR 17.

In addition, although the television receiver 13, laser disc player 15 and VCR 17 have been mentioned as AV components, needless to say, any component other than the above components can be included in AV components.

On the AV system provided by the present invention, when a relatively small number of operating signals are inputted, the status of the AV components are detected. The AV components are switched to the status to perform the required operations. Then, signals for operating the AV components are transmitted out as the remote control code signals. Thus, it is possible to have the AV components perform the required operations by a small number of operating signals.

As explained in detail in the above, according to the present invention, it is possible to provide an AV system which is capable of having AV components perform required operations by using only two or three key operations.

As described above, the present invention can provide an extremely preferable audio-visual system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An audio-visual system comprising:

a plurality of audio-visual components;

input means including a control panel with a plurality of keys for applying an operating signal to each of said components, each said component performing a predetermined operation corresponding to said operating signal, each said keys corresponding to a predetermined function;

status detector means, responsive to the input means, for detecting an operating status of each of the plurality of audio-visual components, the detecting means including a synchronous separator for detecting horizontal/vertical video synchronization signal;

means, responsive to the operating status of the status detector means, for switching the audio-visual components to the operating status required to perform the predetermined operations; and remote control code transmitting means for generating a signal to enable operation of each of the audio-visual components by converting the operating signal to a remote control code signal and for transmitting the remote control code signal to the audio-visual components, wherein an activation of a single function key of the control panel activates the predetermined operation of each of said plurality of components necessary to complete the predetermined function corresponding to said single function key.

2. The audio-visual system as claimed in claim 1, further comprising means for registering respective manufacturers corresponding to the plurality of audio-visual components so that the remote control code transmitting means transmits a remote control code corresponding to the registered manufacturer.

3. The audio-visual system as claimed in claim 1, wherein said remote control code signal is transmitted through optical means.

4. An audio-visual system comprising:

a plurality of audio-visual components;

input means including a control panel with a plurality of keys for applying an operating signal to each of said components, each said component performing a predetermined operation corresponding to said operating signal;

status detector means, responsive to the input means, for detecting an operating status of each of the plurality of audio-visual components, the detecting means including a synchronous separator for detecting horizontal/vertical video synchronization signal;

means, responsive to the operating status of the status detector means, for switching the audio-visual components to the operating status required to perform the predetermined operations;

remote control code transmitting means for generating a signal to enable operation of each of the audio-visual components by converting the operating signal to a remote control code signal and for transmitting the remote control code signal to the audio-visual components, wherein an activation of a single function key of the control panel activates the predetermined operation of each of said plurality of components necessary to complete the predetermined function corresponding to said single function key; and means for registering respective manufacturers of the plurality of audio-visual components by automatically determining the manufacturers according to a pre-stored function, wherein the remote control code transmitting means transmits a remote control code corresponding to the respective registered manufacturer.

5. The audio-visual system as claimed in claim 4, wherein said remote control code signal is transmitted through optical means.

* * * * *